(12) United States Patent
Nakahara

(10) Patent No.: US 8,254,002 B2
(45) Date of Patent: Aug. 28, 2012

(54) SCREEN GENERATING APPARATUS, SCREEN GENERATING METHOD, AND IMAGE PROCESSING APPARATUS

(75) Inventor: Nobuhiko Nakahara, Susono (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 527 days.

(21) Appl. No.: 12/364,571

(22) Filed: Feb. 3, 2009

(65) Prior Publication Data

US 2009/0213433 A1 Aug. 27, 2009

Related U.S. Application Data

(60) Provisional application No. 61/027,208, filed on Feb. 8, 2008.

(51) Int. Cl.
*H04N 1/46* (2006.01)

(52) U.S. Cl. ........................ 358/536; 358/3.06

(58) Field of Classification Search .................. 358/450
See application file for complete search history.

(56) References Cited

U.S. PATENT DOCUMENTS

| | | | |
|---|---|---|---|
| 5,155,599 A | 10/1992 | Delabastita | |
| 5,495,278 A | 2/1996 | Oda et al. | |
| 6,249,355 B1 | 6/2001 | Trask | |
| 6,643,031 B1* | 11/2003 | Takano et al. | 358/1.9 |
| 7,733,534 B2* | 6/2010 | Murakami | 358/3.13 |
| 2002/0061133 A1 | 5/2002 | Ohta et al. | |
| 2003/0025954 A1* | 2/2003 | Takano et al. | 358/536 |
| 2003/0107768 A1 | 6/2003 | Crounse | |
| 2003/0164442 A1* | 9/2003 | Beusch | 250/208.1 |
| 2005/0219628 A1* | 10/2005 | Yasutomi et al. | 358/3.16 |
| 2007/0091369 A1* | 4/2007 | Liu et al. | 358/1.18 |
| 2008/0030783 A1* | 2/2008 | Marshall et al. | 358/1.16 |

FOREIGN PATENT DOCUMENTS

| | | |
|---|---|---|
| JP | 09-216410 | 8/1997 |
| JP | 2000-188684 | 7/2000 |
| JP | 2001-45306 | 2/2001 |
| JP | 3243238 | 10/2001 |
| JP | 2003-234900 | 8/2003 |
| JP | 2007-060111 | 3/2007 |
| JP | 2007-082011 | 3/2007 |
| JP | 2007-196567 | 8/2007 |

OTHER PUBLICATIONS

Japanese Office Action for Japanese Application No. 2009-026493 mailed on Mar. 6, 2012.

* cited by examiner

*Primary Examiner* — Twyler Haskins
*Assistant Examiner* — Helen Q Zong
(74) *Attorney, Agent, or Firm* — Turocy & Watson, LLP

(57) ABSTRACT

Disclosed is a method of generating a screen for an image processing apparatus, which reproduces a multi-gradation image in one pixel using a PWM technique for controlling a pulse width and reference position data. The method includes inputting image data with a first resolution, virtually increasing the first resolution to a second resolution using the reference position data, and generating a screen with the second resolution with respect to the image data using two reference vectors based on the reference position data.

14 Claims, 7 Drawing Sheets

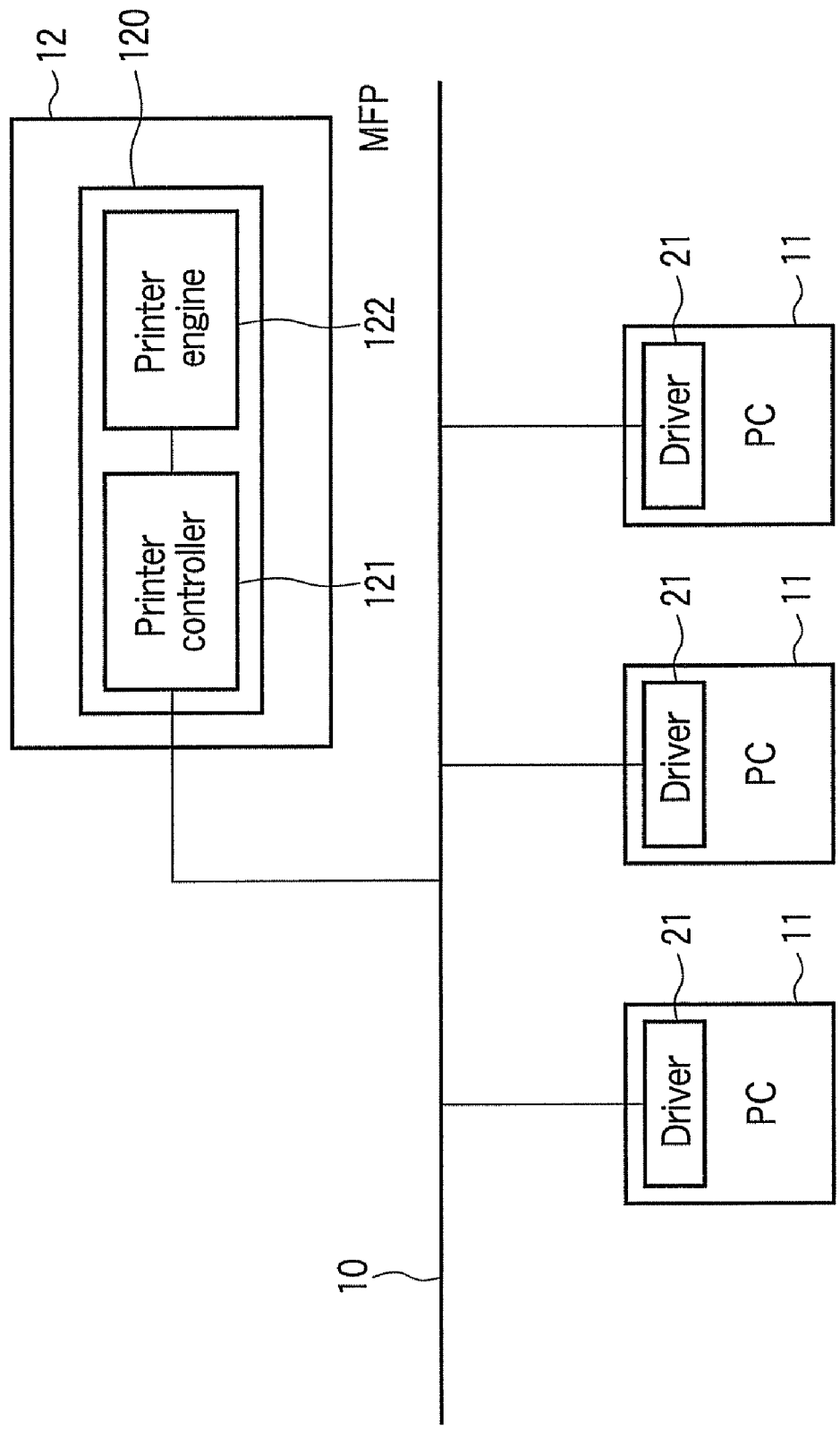
F I G. 1

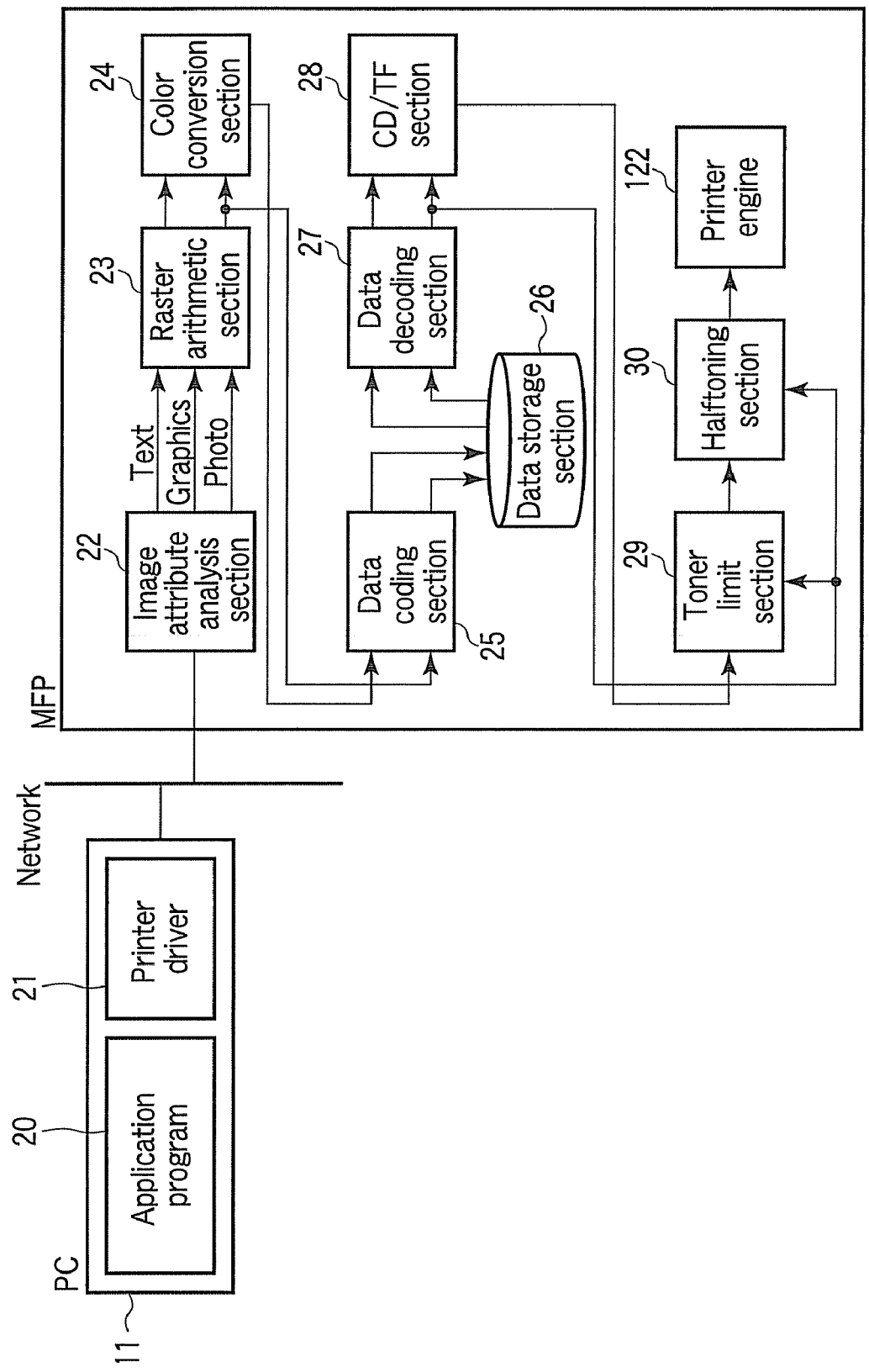
F I G. 2

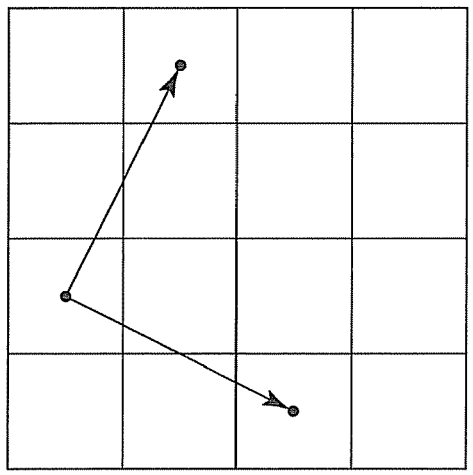 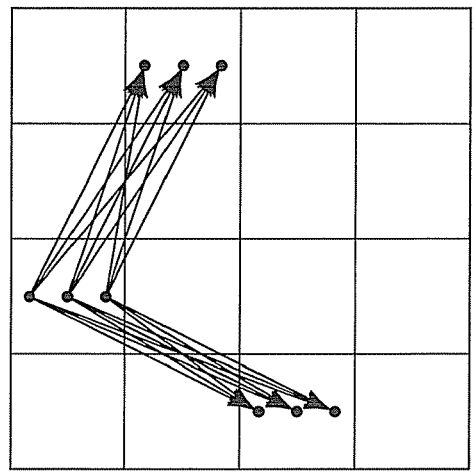
FIG. 6A                FIG. 6B
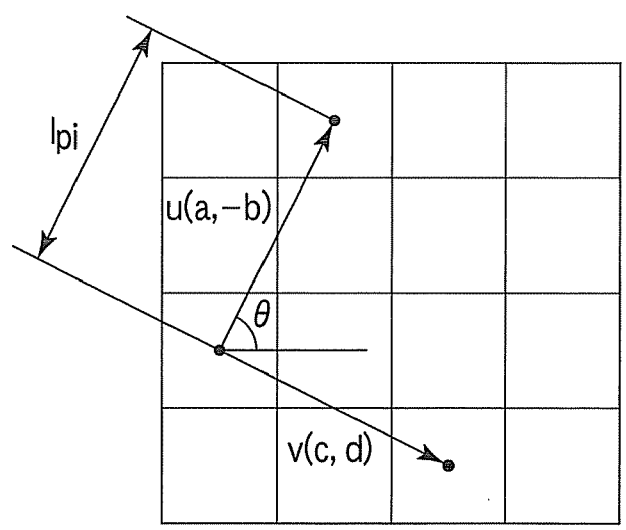
FIG. 7

SCREEN GENERATING APPARATUS, SCREEN GENERATING METHOD, AND IMAGE PROCESSING APPARATUS

CROSS-REFERENCE TO RELATED APPLICATION

This application is based upon and claims the benefit of U.S. Provisional Application No. 61/027,208, filed on Feb. 8, 2008.

TECHNICAL FIELD

The present invention relates to a technique for outputting an image, such as electrophotography for reproducing a multi-gradation image using a PWM technique.

BACKGROUND

In an electrophotographic apparatus, if an FM modulation type dither matrix is used, it is difficult to form an independent 1 pixel (for example, 1 pixel of 600 dpi) in a stable state with the same resolution as the printer (1 dot of 600 dpi is reproduced by the printer of 2400 dpi). Thus, a high-quality image cannot be obtained. For this reason, in an image output apparatus, such as an electrophotographic apparatus, an AM modulation type dither matrix is used, and gradation is reproduced on the basis of the area in units of a plurality of pixels combined. Thereby, a stable image is obtained. AM modulation type dither methods include various shape-type methods, such as a halftone dot type, a line type, and a chain type. These methods, however, are essentially the same in that a plurality of dots are gathered in a given direction, thereby reproducing the gradation.

In order to increase the number of pseudo gradation levels to such a level as to reproduce a visually satisfactory image, it should suffice if the basic size of a halftone dot of a threshold matrix is increased. However, as the basic size of the halftone dot becomes greater, the resolution decreases. Electrophotography does not have a high resolution of several thousand dpi which is the resolution of the printer. Currently dominant type electrophotography has a low resolution of about 600 dpi. There are too many geometrical restrictions in order to obtain satisfactory gradation reproduction by creating halftone dots with a low resolution and a given angle and line number (about 100 to 200). If a screen is forcedly created while ignoring a geometrical position error in a digital arithmetic operation, various problems may be caused. For example, if halftoning is executed using the created threshold matrix, geometrical errors of many halftone centers at the positions on the two-dimensional plane are caused. Consequently, with respect to an image which is formed on the final print surface, textures, which are unsightly, occur due to geometrical errors at given gradation levels to increase granularity.

As methods for improving precision in forming the halftone dots and visually satisfying the gradation, a virtual halftone technique disclosed in U.S. Pat. No. 5,155,599 and Japanese Patent Application Publication (JP-A) No. 2003-234900 is known.

In the image processing apparatus of the electrophotographic system whose resolution is about 600 dpi, a phase shift caused by digital restriction on a two-dimensional space by the virtual halftone dot itself cannot be ignored. For this reason, a subtle cyclic shift of the halftone dot center is visually detected, and roughness or granularity of the image is recognized.

In recent electrophotography, even if a screen of about 200 lines is used, the gradation can be reproduced while the granularity can be prevented from being deteriorated. However, when the resolution is about 600 dpi, a screen of about 200 lines is created with a low degree of freedom, regardless of whether or not it is a binary or multi-value output. In the case of color superimposition of four colors, there is almost no alternative to screen specification (line number and angle). In the color superimposition of four colors, a considerably discrete set of line number and angle is obtained, and color moire is likely to occur according to the color.

SUMMARY

According to a first aspect of the invention, there is provided a method of generating a screen for an image processing apparatus, which reproduces a multi-gradation image in one pixel using a PWM technique for controlling a pulse width and reference position data. The method includes inputting image data with a first resolution, increasing the first resolution to a second resolution using the reference position data, and generating a screen with the second resolution with respect to the image data using two reference vectors based on the reference position data.

According to a second aspect of the invention, there is provided a screen generating apparatus that reproduces a multi-gradation image in one pixel using a PWM technique for controlling a pulse width and reference position data, the apparatus comprising: an input section configured to input image data with a first resolution; a resolution conversion section configured to increase the first resolution to a second resolution using the reference position data; and a screen generation section configured to generate a screen with the second resolution with respect to the image data using two reference vectors based on the reference position data.

According to a third aspect of the invention, there is provided an image processing apparatus that supplies output data to an image forming apparatus, which reproduces a multi-gradation image in one pixel using a PWM technique for controlling a pulse width and reference position data, the apparatus comprising: an input section configured to input image data with a first resolution; a resolution conversion section configured to increase the first resolution to a second resolution using the reference position data; and a screen generation section configured to generate output data obtained by screening the image data with the second resolution using two reference vectors based on the reference position data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing a system configuration using an MFP as an image processing apparatus.

FIG. 2 is a block diagram showing an example of the configuration of a printer controller within an MFP.

FIG. 6A is a diagram showing two reference vectors when a screen is generated with a usual resolution.

FIG. 6B is a diagram showing two reference vectors when a screen is generated with a virtual resolution.

FIG. 7 is a diagram showing two reference vectors.

DETAILED DESCRIPTION

Figure 3:
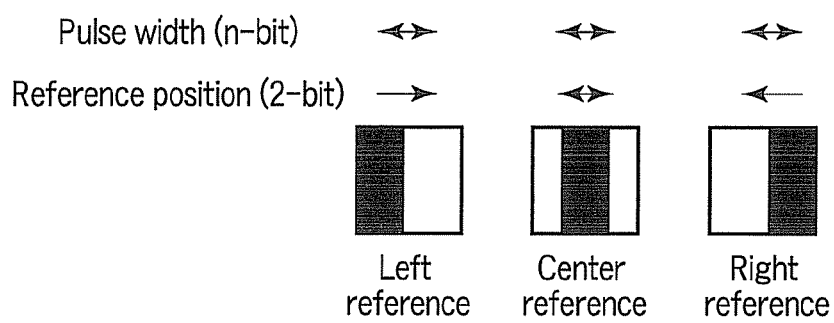
FIG. 3 is a diagram showing a control operation of PWM control for one pixel.

An embodiment of a digital multi function peripheral (MFP) using an electrophotographic printer will now be described. It is assumed that the engine resolution is 600 dpi.

FIG. 1 is diagram showing a system configuration using an MFP 12 as an image processing apparatus.

In the system shown in FIG. 1, a computer terminal (PC) 11 which is connected to a network 10 transfers PDL (Page Description Language) data indicating the structure of image data or raster data to a printer 120 which is a partial function within the MFP 12. That is, the PC 11 transfers PDL data or raster data from a printer driver 21 to a printer controller 121 in accordance with characteristics of an interface with the printer 120.

In the printer 120, the printer controller 121 controls a printer engine 122. The printer controller 121 develops PDL data from the PC 11 into a bitmap, executes image processing, and stores image data in a data storage section. The printer engine 122 converts bitmap image data from the printer controller 121 to a drive signal, and executes a printing operation, for example, by feeding paper and driving a laser.

The printer controller 121 can analyze the attribute of each object, execute optimum image processing for each object, synthesize data obtained by image processing, and output the resultant data.

The PC 11 and the printer 120 are not necessarily connected over the network, and may be connected by a USB. In addition, the PC 11 and the printer 120 may be connected in one-to-one correspondence. The interface between the printer controller 121 and the printer engine 122 depends on the architecture of the printer.

FIG. 2 is a block diagram showing an example of the configuration of the printer controller 121 within the MFP 12. The printer controller 121 includes an image attribute analysis section 22, a raster arithmetic section 23, a color conversion section 24, a data coding section 25, a data storage section 26, a data decoding section 27, a CD/TF section 28, a toner limit section 29, and a halftoning section 30.

PDL data that is transferred from the printer driver 21 by a print command on an application program 20 of the PC 11 is transferred to the printer controller 121 through the network. In the printer controller 121, the image attribute analysis section 22 analyzes the attribute of an image on the basis of received PDL data, and classifies the kind of the image. Basically, the image has one of a text attribute, a graphic attribute, and image bitmap attribute. The classified data attribute is allocated a corresponding tag for a subsequent process. For example, when the image has the above-described three kinds of attributes, 2-bit tag data is necessary.

The raster arithmetic section 23 converts PDL data to bitmap data. For example, in the case of a monochromatic printer, PDL data is converted to single-color 8-bit bitmap data. In the case of a color printer, PDL data is converted to 8-bit bitmap data for each color. In this case, each bitmap data is allocated tag data corresponding to the position thereof.

The color conversion section 24 converts the converted 8-bit RGB signal for each color, which is a standard signal in a monitor, to CMY or CMYK of reproduction colors in the printer. R, G, and B indicate red, green, and blue, and C, M, Y, and K indicate cyan, magenta, yellow, and black, respectively. In the example of FIG. 2, the color conversion section 24 switches color conversion corresponding to the attribute of the image on the basis of tag data. If an output apparatus is a monochromatic printer, the color conversion section 24 is unnecessary.

Next, the color-converted image is sent to the data coding section 25, and data compression is executed. A compression scheme that compresses multi-value image data may be suitably used for compression in this case. In addition, an irreversible compression scheme may be used. Next, the compressed image data is temporarily stored in the data storage section 26, such as a memory or an HDD. The compression ensures reduction in the quantity of data to be stored in the data storage section 26, and an increase in performance of the entire system. If data is temporarily stored in the data storage section 26, a function, such as electronic sorting, can be effectively used.

The data decoding section 27 reads out data from the data storage section 26, and decodes coded data.

The CD/TF section 28 executes γ conversion for obtaining image density calibration corresponding to the characteristic of the printer engine 122 or favorite gradation characteristic for the bitmap-converted image. The CD/TF section 28 executes γ conversion corresponding to the image characteristic of each object and tag data.

The toner limit section 29 converts image data so that the total supply amount of CMYK of the engine falls within a limit range smaller than a maximum printable amount of toner to be stuck. The toner limit section 29 changes the toner limit amount in accordance with the image characteristic of each object and tag data.

The halftoning section 30 converts 1-pixel data to image data, for example, by halftoning using a threshold matrix. In this case, image data has the number of gradation levels corresponding to the number of bits in accordance with the printing capability of the printer 120. The halftoning section 30 executes halftoning in accordance with the image characteristic of each object and tag data.

The printer engine 122 converts image data to a PWM (Pulse Width Modulation) signal for driving the laser, and forms an image.

FIG. 3 is a diagram showing a control operation of PWM control for one pixel. In the case of multi-value PWM control, in addition to a pulse width, a reference position control signal is generated at the same time on the basis of the input image data. When a pixel at an intermediate gradation level is printed, the gradation range and the start position (left reference, right reference, and center reference) are controlled. In general, if the position control signal is the left reference signal and the right reference signal, an image can be formed. If the position needs to be controlled with higher precision, the center reference signal is also used.

Figure 4A:
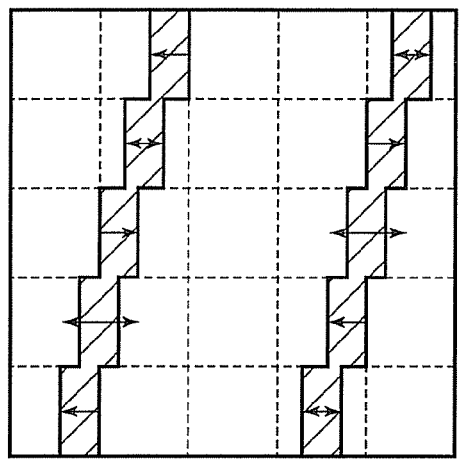
FIG. 4A is a diagram showing an example of an image forming pattern using a reference position signal.
Figure 4B:
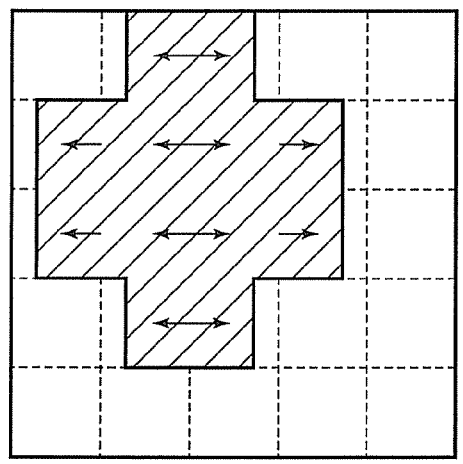
FIG. 4B is a diagram showing an example of an image forming pattern using a reference position signal.

FIGS. 4A and 4B are diagrams showing examples of an image forming pattern using a reference position signal. FIG. 4A shows a line type screen pattern, and FIG. 4B shows a halftone dot type screen pattern. In FIGS. 4A and 4B, the printing start position and the printing direction are indicated by arrows.

The reference position signal is used to stabilize pixel formation. For example, in FIG. 4A, a stable line having the same width is formed by setting a reference position for each pixel. That is, the reference position signal is used in order to reduce jaggy in the contour and to form a smooth line. In FIG. 4B, the reference position signal is used in order to stabilize halftone formation so that a dead pixel does not occur. That is, position information of the reference position signal is a value which is decided during the calculation for generating a screen pattern. The setting of the reference position signal and the improvement of the resolution in the image signal data do not have direct relation.

Figure 5B:
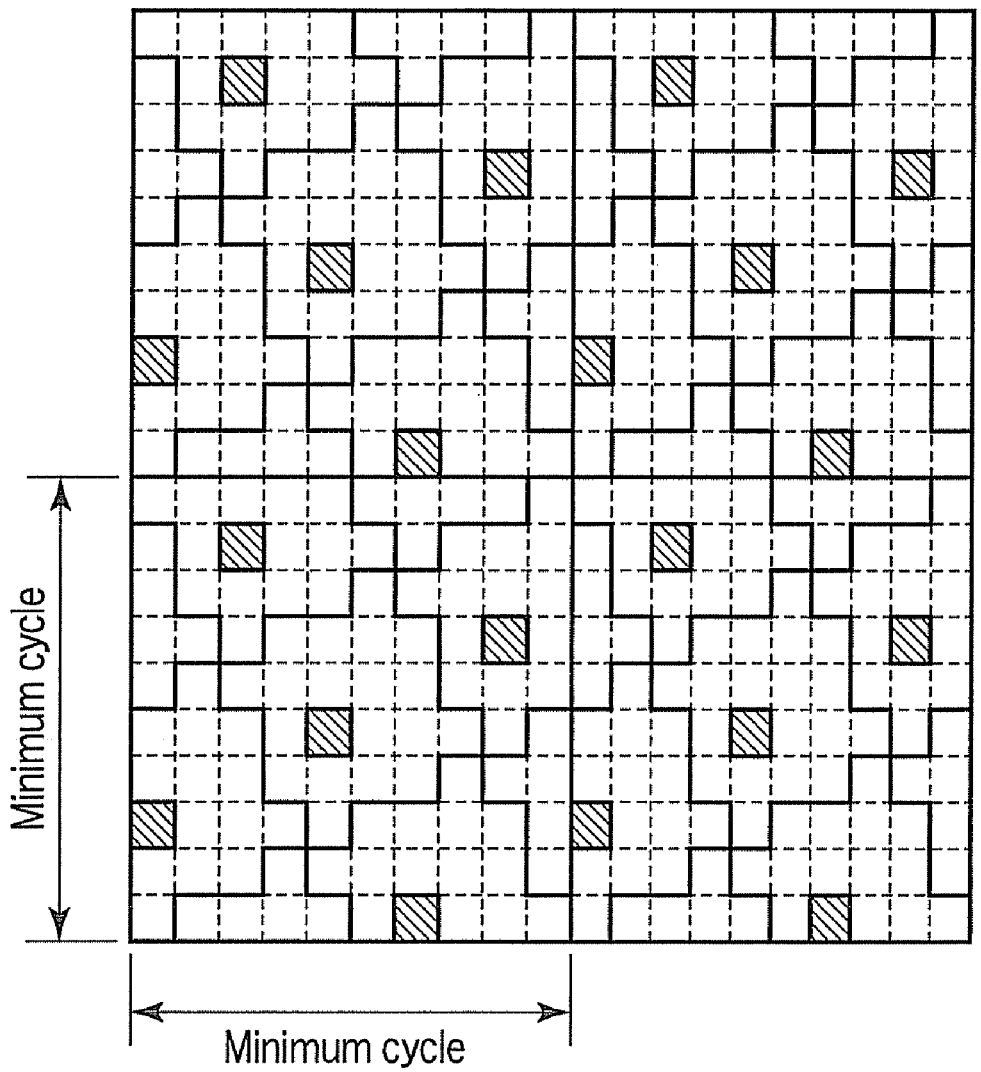
FIG. 5B is a diagram illustrating the creation of a basic threshold matrix for specifying a pixel growth order by area modulation.
Figure 5A:
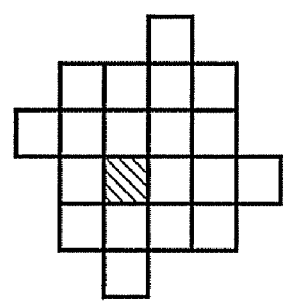
FIG. 5A is a diagram illustrating the creation of a basic threshold matrix for specifying a pixel growth order by area modulation.

FIGS. 5A and 5B show examples of a halftone dot type halftone, and illustrates creation of a basic threshold matrix for specifying a pixel growth order by area modulation. FIG. 5A is a diagram showing a basic halftone unit. The basic halftone unit has 20 cells in total including 16 cells arranged in a square shape and four cells provided at respective sides. One cell corresponds to one pixel. In the case of binary, an arbitrary threshold value is allocated to each cell, and in the case of multi-value, [the number of values −1] threshold values are allocated to each cell. In the basic halftone unit, for example, as the number of gradation levels increases, a black portion spreads around a center position indicated by black in FIG. 5A as a start point. A way to increase the black portion of the pixel (growth order) is specified by the basic threshold matrix.

FIG. 5B is a diagram showing a rectangular threshold matrix which is developed so as to be digitally halftoned. In the rectangular threshold matrix, the basic halftone unit is formed in a tile shape. The threshold matrix of a minimum size is digitally repeatedly used to have such a size that halftoning by an address arithmetic operation may be executed. Therefore, the minimum size gives a minimum cycle of a repetitive arithmetic operation. In addition, the minimum size of the threshold matrix is geometrically self-determined on the basis of the shape of the halftone unit.

Referring to FIG. 5B, a threshold matrix has a minimum value within the halftone unit at each of a plurality of basic halftone centers (black portions in FIG. 5B). The halftone centers have an equal distance from the most adjacent halftone centers. In addition, the threshold matrix includes lattice elements to be addressable at a rational tangent angle. From this standpoint, each cell (dot) of FIG. 5B is not a virtual halftone dot, and a group of halftone units whose positions can be completely defined in a digital arithmetic operation is obtained. Halftoning itself may be realized in various ways, including a threshold process by a threshold matrix, and an LUT process using data of a table format.

The screen generating method of the related art is executed in units of one basic pixel divided with the resolution of 600×600 dpi. Tiling is also executed in units of one basic pixel. In this embodiment, the reference position signal for PWM control is used as virtual resolution information. When three reference position signals of the left, center, and right are provided, one pixel of 600 dpi includes three kinds of resolution information. Therefore, the resolution of about 1800 dpi can be obtained, and the halftone cells can be formed on the two-dimensional plane so as to be uniformly arranged.

FIGS. 6A and 6B are diagrams showing examples of vector expansion by virtual improvement of resolution. FIG. 6A shows two reference vectors when a screen is generated with a usual resolution. Two reference vectors with one cell from among the halftone cells as an initial point are selected. The two reference vectors are synthesized, and the basic halftone cell is decided. A rectangular screen table which can be digitally processed is generated by tiling the basic halftone cell.

FIG. 6B shows two reference vectors when a screen is generated with a virtual high resolution. If the reference position signal is used as virtual resolution information, a usual halftone cell is virtually divided into three cells. Therefore, two reference vectors with one cell within the halftone cell as an initial point can be selected. A screen is generated on the basis of two reference vectors of resolution information with a seemingly increased resolution (in FIG. 6B, the resolution is increased to 1800 dpi) in a division direction of the PWM. Thereby, a vector, which cannot be realized with an actual resolution, can be set, and as a result, halftone dots with a high degree of freedom for line number and angle can be formed.

A specific description will be provided in connection with Expressions. It is assumed that two reference vectors shown in FIG. 7 are u(a,−b) and v(c,d). In terms of u, the number of lines (lpi) of a screen to be formed by the two vectors can be expressed by Expression (1).

$$lpi = \frac{\sqrt{1 + \left(\frac{-b/Ydpi}{a/Xdpi}\right)^2}}{\left|d/Ydpi - \left(\frac{-b/Ydpi}{a/Xdpi}\right) * c/Xdpi\right|} \quad (1)$$

The angle (θ) of the screen can be expressed by Expression (2).

$$\theta = \tan^{-1}\left(\frac{-b/Ydpi}{a/Xdpi}\right) * \frac{180}{\pi} \quad (2)$$

In the case of a screen of an orthonormal system, two vectors are u(a,−b) and v(b,a). The two vectors have the same length and are orthogonal (inner product 0).

As can be seen from Expressions (1) and (2), the resolution Xdpi in the main scanning direction is three times higher than the related art. Therefore, the number of combinations of u and v vectors within required ranges of line number and angle can be increased, and as a result, halftone dots with line number and angle having a higher degree of freedom of formation can be formed.

Figure 8:
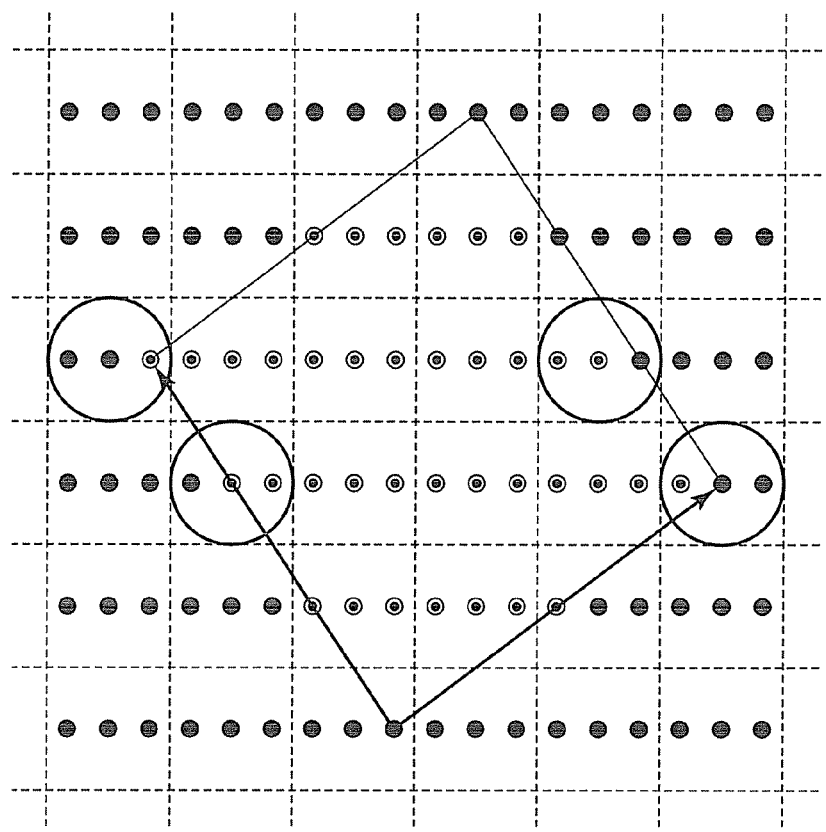
FIG. 8 is a diagram showing a halftone cell which is formed using three subpixels divided from one pixel.

FIG. 8 is a diagram showing a halftone cell which is formed using three subpixels divided from one pixel of 600 dpi. In FIG. 8, points indicated by double circles represent subpixels to be formed by two reference vectors. In FIG. 8, black points represent subpixels belonging to other halftone cells.

In FIG. 8, subpixels belonging to different halftone cells are mixed in the cells which are surrounded by large circles. One pixel is virtually divided into three subpixels, and if the subpixels are allocated to different halftone cells, a dead pixel may occur. In this embodiment, a reference position signal of a subpixel having a high priority of pixel growth is preferentially allocated to a corresponding pixel. Therefore, an adverse effect of a dead pixel can be suppressed.

Figure 9:
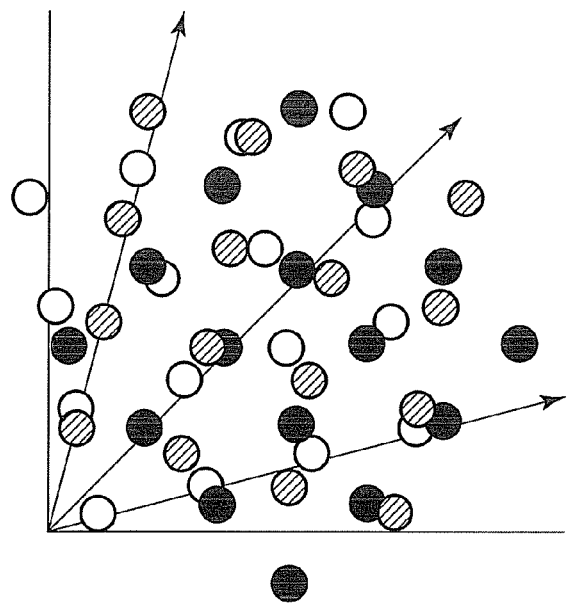
FIG. 9 is a diagram illustrating a general halftone dot theory.

Color will be described. In the method for gradation reproduction by area modulation (AM screen), when a mechanical color halftone shift occurs, color moire may be caused. For this reason, it is necessary to set a different screen angle for each color halftone. In general, according to the halftone dot theory, yellow whose pattern is not noticed alone is excluded, and as shown in FIG. 9, if the screens of cyan, magenta, and black are set to have the same line number and different angles by 30° (for example, 15°, 45°, and 75°). Thereby, in theory, occurrence of color moire can be suppressed.

It is difficult to form a screen of theoretic irrational tangent with the resolution of about 600 dpi. Actually, in the electrophotography, if yellow is mixed with other colors, color moire of yellow may be noticed.

In this embodiment, a screen generation method, in which the resolution is virtually improved, and a screen generation method with a normal resolution is selected for each color. Therefore, a difference in the number of lines of the screen between colors and a difference in the angle are effectively adjusted.

Figure 10:
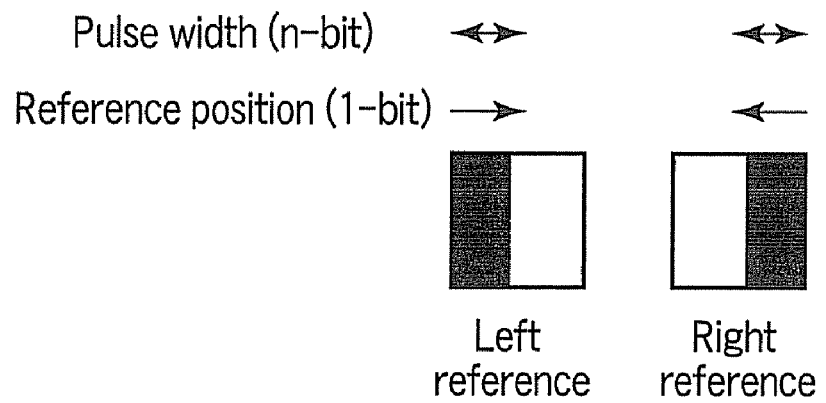
FIG. 10 is a diagram showing an example using two kinds of reference position signals.
Figure 11:
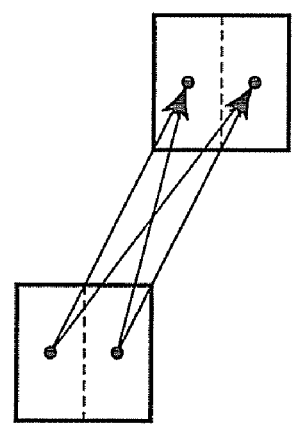
FIG. 11 is a diagram showing a reference vector whose resolution is increased two times.

For example, as shown in FIG. 10, two kinds of reference position signals at the left and right may be used so that the virtual resolution is increased two times. A screen may be generated using reference vectors shown in FIG. 11.

The screen angle may be set to an angle which cannot be realized with the usual resolution. For example, the screen angle $\alpha$ of at least one color can be set to a value which is expressed by Expression (3).

$$\tan \alpha = k \times j / (n + k \times i) \quad (3)$$

$$\tan \alpha \neq (j/i)$$

Here, i is a (main scan side) arbitrary integer, j is a (sub scan side) arbitrary integer, k is the number of kinds of reference position signals, and n is an integer ranging from 0 to (k−1).

Although in this embodiment, a case in which two kinds or three kinds of reference position signals are used is described, K kinds (where K is an integer of 2 or more) of reference position signals may be used. In addition, although in this embodiment, an image is formed by arranging a plurality of pixels in the main scanning direction and the sub scanning direction, an image to be used herein is not limited to such an image.

According to this embodiment, a screen with a subtle line number and angle is generated by using the reference position signal as virtual resolution information in generating a screen. Therefore, several times of different kinds of vectors can be virtually specified, and thus a degree of freedom for generating the line number and angle is considerably improved. The screen setting angle of each color can be set to be substantially orthogonal, and as a result, color moire due to color superimposition can be easily controlled.

The generation of the halftone screen of this embodiment can be realized by a process in the halftoning section 30 shown in FIG. 2. For example, in addition to a threshold process using a threshold matrix, the halftoning section 30 can execute various processes, for example, an LUT (Look Up Table) process using data of a table format.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of generating a screen for an image processing apparatus, which reproduces a multi-gradation image in one pixel using a Pulse Width Modulation technique, the method comprising:

inputting image data with a first resolution;
   controlling a pulse width and reference position data; and
   generating a screen with a second resolution with respect to the image data using two reference vectors based on the reference position data, the second resolution being enhanced from the first resolution using the reference position data,
   when the screen is formed with the second resolution, if subpixels within one pixel are allocated to different halftone cells, a position signal of a subpixel having a high priority of pixel growth being preferentially allocated to a corresponding pixel.

2. The method according to claim 1,
   wherein the screen formed with the second resolution includes halftone dots with a line number and angle which are not included in the screen formed with the first resolution.

3. The method according to claim 1,
   wherein the second resolution is set to be three times higher than the first resolution using three kinds of left, center, and right position signals as the reference position data.

4. The method according to claim 1,
   wherein the second resolution is set to be two times higher than the first resolution using two kinds of left and right position signals as the reference position data.

5. A method of generating a screen for an image processing apparatus, which reproduces a multi-gradation image in one pixel using a Pulse Width Modulation technique, the method comprising:

inputting image data with a first resolution;
   controlling a pulse width and reference position data; and
   generating a screen with a second resolution with respect to the image data using two reference vectors based on the reference position data, the second resolution being enhanced from the first resolution using the reference position data,
   when a color screen is formed, the screen formed with the second resolution and a screen formed with the first resolution being selectively combined for each color, to thereby adjust a difference in screen angle between colors.

6. A method of generating a screen for an image processing apparatus, which reproduces a multi-gradation image in one pixel using a Pulse Width Modulation technique, the method comprising:

inputting image data with a first resolution;
   controlling a pulse width and reference position data; and
   generating a screen with a second resolution with respect to the image data using two reference vectors based on the reference position data, the second resolution being enhanced from the first resolution using the reference position data
   the image being an image in which a plurality of pixels are arranged in a main scanning direction and a sub scanning direction,
   the second resolution being set to be K times higher than the first resolution using K kinds (where K is an integer of 2 or more) of position signals as the reference position data, and a screen angle α of at least one color being expressed by the following expression:

$$\tan \alpha = k \times j / (n + k \times i)$$

$$\tan \alpha \neq (j/i)$$

for the expression, i is a main scan side arbitrary integer, j is a sub scan side arbitrary integer, k is the number of kinds of reference position signals, and n is an integer ranging from 0 to (k−1).

7. An apparatus for generating a screen that reproduces a multi-gradation image in one pixel using a Pulse Width Modulation technique, the apparatus comprising:
an input section configured to input image data with a first resolution;
controlling a pulse width and reference position data;
a resolution conversion section configured to increase the first resolution to a second resolution using the reference position data; and
a screen generation section configured to generate a screen with the second resolution with respect to the image data using two reference vectors based on the reference position data,
when the screen is formed with the second resolution, if subpixels within one pixel are allocated to different halftone cells, the screen generation section preferentially allocating a position signal of a subpixel having a high priority of pixel growth to a corresponding pixel.

8. The apparatus according to claim 7,
wherein the screen formed with the second resolution includes halftone dots with a line number and angle which are not included in the screen formed with the first resolution.

9. The apparatus according to claim 7,
wherein the resolution conversion section sets the second resolution to be three times higher than the first resolution using three kinds of left, center, and right position signals as the reference position data.

10. The apparatus according to claim 7,
wherein the resolution conversion section sets the second resolution to be two times higher than the first resolution using two kinds of left and right position signals as the reference position data.

11. An apparatus for generating a screen that reproduces a multi-gradation image in one pixel using a Pulse Width Modulation technique, the apparatus comprising:
an input section configured to input image data with a first resolution;
a control section configured to control a pulse width and reference position data;
a resolution conversion section configured to increase the first resolution to a second resolution using the reference position data; and
a screen generation section configured to generate a screen with the second resolution with respect to the image data using two reference vectors based on the reference position data,
when generating a color screen, the screen generation section selectively combining the screen formed with the second resolution and a screen formed with the first resolution for each color, to thereby adjust a difference in screen angle between colors.

12. An apparatus for generating a screen that reproduces a multi-gradation image in one pixel using a Pulse Width Modulation technique, the apparatus comprising:
an input section configured to input image data with a first resolution;
a control section configured to control a pulse width and reference position data;
a resolution conversion section configured to increase the first resolution to a second resolution using the reference position data; and
a screen generation section configured to generate a screen with the second resolution with respect to the image data using two reference vectors based on the reference position data,
the image being an image in which a plurality of pixels are arranged in a main scanning direction and a sub scanning direction,
higher than the first resolution using K kinds (where K is an integer of 2 or more) of position signals as the reference position data,
a screen angle α of at least one color being expressed by the following expression:

$$\tan \alpha = k \times j / (n + k \times i)$$

$$\tan \alpha \neq (j/i)$$

for the expression, i is a main scan side arbitrary integer, j is a sub scan side arbitrary integer, k is the number of kinds of reference position signals, and n is an integer ranging from 0 to (k−1).

13. An image processing apparatus that supplies output data to an image forming apparatus, which reproduces a multi-gradation image in one pixel using a Pulse Width Modulation technique, the apparatus comprising:
an input section configured to input image data with a first resolution;
a control section configured to control a pulse width and reference position data;
a resolution conversion section configured to increase the first resolution to a second resolution using the reference position data; and
a screen generation section configured to generate output data obtained by screening the image data with the second resolution using two reference vectors based on the reference position data,
the image being an image in which a plurality of pixels are arranged in a main scanning direction and a sub scanning direction,
the second resolution being set to be K times higher than the first resolution using K kinds (where K is an integer of 2 or more) of position signals as the reference position data, and
a screen angle α of at least one color being expressed by the following expression:

$$\tan \alpha = k \times j / (n + k \times i)$$

$$\tan \alpha \neq (j/i)$$

for the expression, i is a main scan side arbitrary integer, j is a sub scan side arbitrary integer, k is the number of kinds of reference position signals, and n is an integer ranging from 0 to (k−1).

14. An image processing apparatus using a Pulse Width Modulation technique, the apparatus comprising:
- a processing section configured to input image data with a first resolution;
- control a pulse width and reference position data; and
- generate a screen with a second resolution with respect to the image data using two reference vectors based on the reference position data,
- the second resolution being enhanced from the first resolution using the reference position data,
- when the screen is formed with the second resolution, if subpixels within one pixel are allocated to different halftone cells, a position signal of a subpixel having a high priority of pixel growth being preferentially allocated to a corresponding pixel.

* * * * *